United States Patent [19]
Sexton et al.

[11] Patent Number: 5,270,916
[45] Date of Patent: Dec. 14, 1993

[54] APPARATUS AND METHOD FOR PREVENTING RUNAWAY OF THE INTEGRAL TERM OF A PROPORTIONAL PLUS INTEGRAL CONTROLLER

[75] Inventors: Daniel W. Sexton, Charlottesville; Richard K. Davis, Crozet, both of Va.

[73] Assignee: GE Fanuc Automation North America, Inc., Charlottesville, Va.

[21] Appl. No.: 486,063

[22] Filed: Feb. 27, 1990

[51] Int. Cl.$^5$ ............................................. G05B 11/36
[52] U.S. Cl. ..................................... 364/161; 364/162; 364/153
[58] Field of Search ............... 364/153, 161, 162, 154; 318/609, 610

[56] References Cited

U.S. PATENT DOCUMENTS

| | | | |
|---|---|---|---|
| 3,582,629 | 6/1971 | Ross | 364/162 |
| 3,938,017 | 2/1976 | Hayes | 318/610 |
| 4,236,202 | 11/1980 | Giles et al. | 364/162 |
| 4,268,784 | 5/1981 | Ganaway | 318/610 |
| 4,580,208 | 4/1986 | Sukimoto et al. | 364/162 |
| 4,727,303 | 2/1988 | Morse et al. | 318/616 |
| 4,749,928 | 6/1988 | Dautremay et al. | 318/610 |
| 4,806,836 | 2/1989 | Webb | 318/609 |
| 4,872,104 | 10/1989 | Holsinger | 364/166 |
| 4,999,557 | 3/1991 | Inoue | 318/609 |

FOREIGN PATENT DOCUMENTS 3433410 3/1986 Fed. Rep. of Germany .

OTHER PUBLICATIONS

Proceedings of the 1989 American Control Conference, vol. 2, pp. 1699-1705 Jun. 21-23, 1989.
"Stability And Performance Of A Control System With An Intelligent Limiter" Sangsik Yang, Ming C. Leu. Proceedings of the 1988 American Control Conference, vol. 2, pp. 1135-1139, Jun. 15-17, 1988.
"Teachware For Control", by Walter Schaufelberger. Automatisierungstechnik, vol. 35, No. 11, pp. 464-465, "Zum Fuhrungsverhalten von PID-ARW-Eingrobenkreisen" by A. H. Glattfelder, Jan. 1987, Winterthur, und W. Schaufelberger.

Primary Examiner—Jerry Smith
Assistant Examiner—Paul Gordon
Attorney, Agent, or Firm—James H. Beusse

[57] ABSTRACT

An apparatus and method are provided for preventing the runaway of the integral term of a proportional integral differential controller which is usable in a feedback system. An error signal is supplied to the controller by the feedback system. The controller produces a control variable output signal from the error signal. In accordance with the invention, the controller imposes a slew rate limit on the control variable output signal. Also in accordance with the invention, whenever the controller attempts to drive the control variable output signal to exceed the slew rate limit, the integral term associated with the controller is adjusted to a value which forces the control variable output signal to its slew rate limited value. In this manner, runaway of the integral term associated with the controller is desirably avoided.

3 Claims, 2 Drawing Sheets

APPARATUS AND METHOD FOR PREVENTING RUNAWAY OF THE INTEGRAL TERM OF A PROPORTIONAL PLUS INTEGRAL CONTROLLER

BACKGROUND OF THE INVENTION

This invention relates in general to programmable logic controllers and, more particularly, to feedback systems employed in conjunction with a programmable logic controller to control a process.

Programmable logic controllers (PLC's) are a relatively recent development in process control technology. As a part of process control, a programmable logic controller is used to monitor input signals from a variety of input modules (input sensors) which report events and conditions occurring in a controlled process. For example, a PLC can monitor such input conditions as motor speed, temperature, pressure, volumetric flow and the like. A control program is stored in a memory within the PLC to instruct the PLC what actions to take upon encountering particular input signals or conditions. In response to these input signals provided by input sensors, the PLC derives and generates output signals which are transmitted to various output devices to control the process. For example, the PLC issues output signals to speed up or slow down a motor, open or close a relay, raise or lower temperature or adjust pressure as well as many other possible control functions too numerous to list.

Feedback systems are often implemented in conjunction with or within such programmable logic controllers. An example of one such conventional feedback system is shown in simplified block diagram form in FIG. 1 as feedback system 10. In system 10 it is assumed that it is desired to drive motor 15 at a selected speed. A command signal is generated to instruct motor 15 to turn at the selected speed. However, before being applied to motor 15, the command signal requires processing. The command signal is applied to the positive port of a summing junction 20. The output of summing junction 20 is applied to a control input of motor 15 via a proportional plus integral plus differential (PID) controller 25 coupled therebetween. The speed of motor 15 is sensed by sensor 30 which reports indicia of the speed of motor 15 back to the negative port of summing junction 20. If there is any difference between the actual speed of motor 15 and the speed instructed by the command signal, then a corresponding error signal is generated at the output of summing junction 20. However, once the speed of motor 15 reaches the speed instructed by the command signal, little or no error signal is generated at the output of summing junction 20.

In the example feedback system 10, PID controller 25 interprets the error signal and instructs motor 15 to turn at a speed related to that instructed by the command signal. More specifically, based on whatever error signal, if any, is applied to PID controller 25, controller 25 produces a control variable signal (CV) which includes a proportional term, an integral term and a differential term. The proportional term is related proportionally to the magnitude of the error signal at any point in time. The integral term increases in size over time when the error signal is positive and decreases in size over time when the error signal is negative. The portion of the CV signal due to the integral term actually holds the motor at the selected speed once the error has decreased to zero. The differential term is utilized in instances where it is desirable to respond to a large initial impetus such as at motor start-up or to accentuate small error signals. The particular relationship of the proportional, integral and differential terms of a particular PID controller are conveniently expressed in terms of a PID control algorithm well known to those skilled in the art.

Such a PID controller 25 as described above may be implemented within the control program which controls the operation of a programmable logic controller. In typical PID applications which require a slew rate limited output, a separate slew rate limit is placed on the output of the control variable (CV) in the form of a clamp on control variable CV. This function does not interact with the PID control algorithm in any way other than to limit the control signal before it is applied to the controlled process (motor 15, in the example of FIG. 1).

Motors and other controlled devices in a process often have finite operating limits which should not be exceeded for fear of damage to the controlled device. For example, a motor will have a rated speed limit associated therewith. One way to assure that the rated speed of the motor is never exceeded is to clamp the input of the motor such that the controlled variable signal seen by the motor never gets so large as to over-speed the motor. This will protect the motor from over-speed conditions; however, other problems may be caused by such maximum signal limits. For example, if the selected motor speed indicated by the command signal is greater than the maximum allowable motor speed, the motor speed will be limited. The motor will not reach the selected speed and the error signal at the output of the summing junction will remain present. The integrator within the PID controller will continue to integrate the error signal until the PID controller goes into saturation. In this scenario, the integral term may grow to a very large quantity and become so large that when a command signal is finally given to decrease motor speed, an unduly long time may be required to negate the accumulated value of the integral term before an appropriate CV signal is finally generated to reduce motor speed.

SUMMARY OF THE INVENTION

Accordingly, one object of the present invention is to provide an apparatus and method for preventing runaway of the integral term produced by a proportional plus integral controller implementation within a programmable logic controller which is employed to control a feedback system.

Another object the present invention is to provide an apparatus and method for permitting a feedback system employed in conjunction with a PLC to recover more quickly from the clamped condition of the controlled variable, CV.

In accordance with the present invention, a proportional plus integral controller or a proportional plus integral plus differential controller is provided for use in a feedback system associated with a controlled process. The feedback system includes a summing junction for subtracting a process variable sensed in the controlled process from a set point to produce an error signal which is supplied to the controller. The controller produces a proportional term and an integral term from the error signal. The controller includes a summing junction for summing the proportional term and the integral term to produce a control variable output signal. The controller also includes a limiter for imposing a slew rate limit on the control variable output signal. A detector is provided in the controller for detecting when the controller attempts to drive the control variable output signal to exceed the slew rate limit. The controller also includes an adjusting apparatus for adjusting the integral term to a value which forces the control variable output signal to a value which prevents runaway of the integral term.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings:

DETAILED DESCRIPTION OF THE INVENTION

Figure 1:
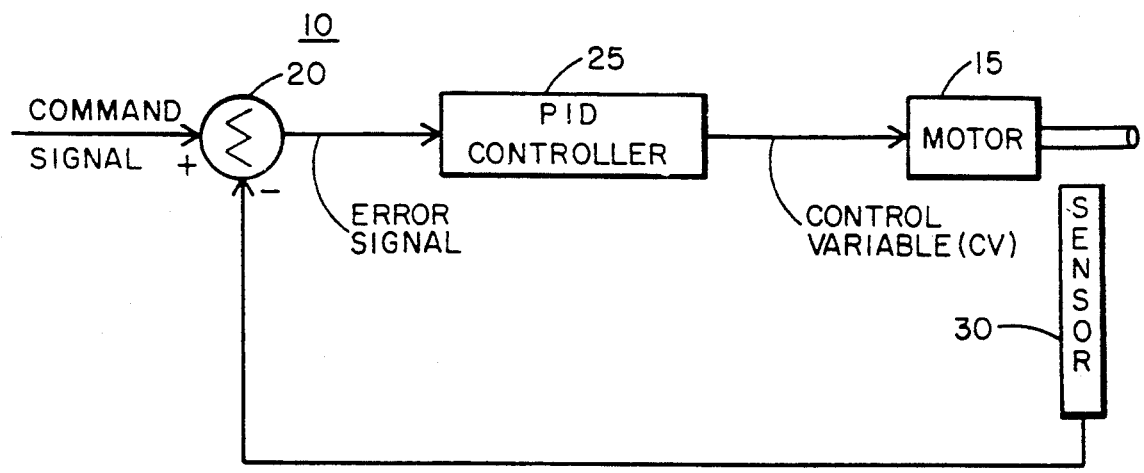
FIG. 1 is a representation of a simplified feedback system represented in block diagram form.
Figure 2:
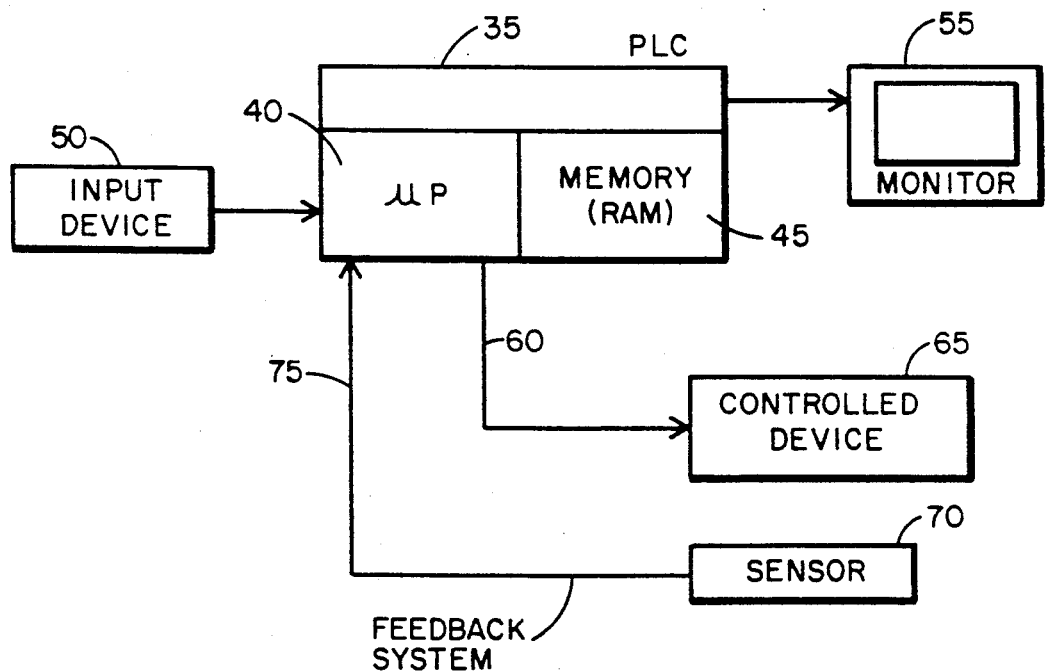
FIG. 2 is a block diagram of a basic programmable logic controller.

FIG. 2 shows a block diagram representation of a typical programmable logic controller (PLC) employed in the present invention as PLC 35. PLC 35 includes a microprocessor 40 for performing the calculations necessary to control a controlled process. Microprocessor 40 is coupled to a Random Access Memory (RAM) 45 within PLC 35 which provides temporary storage to the control program employed to supervise the controlled process. An input device 50 such as a keyboard or other programmer is coupled to PLC 35 to permit the user to readily program PLC 35 with a control program and other information. A display 55 is coupled to PLC 35 to permit the user to monitor the controlled process.

PLC 35 includes an output bus 60 on which PLC 35 generates a controlled variable signal (CV) to control a controlled device (output device) 65 which is coupled to output bus 60. Controlled device 65 may be a motor, thermostat, volumetric flow control or virtually any other output device, for example. In this particular embodiment of the invention, an input device such as a sensor 70 monitors the performance of the controlled device 65. Sensor 70 is coupled to an input bus 75 of PLC 35 to report back input information to PLC 35. Input bus 75 thus provides a feedback path to PLC 35 for the feedback signal produced by sensor 70.

Figure 3:
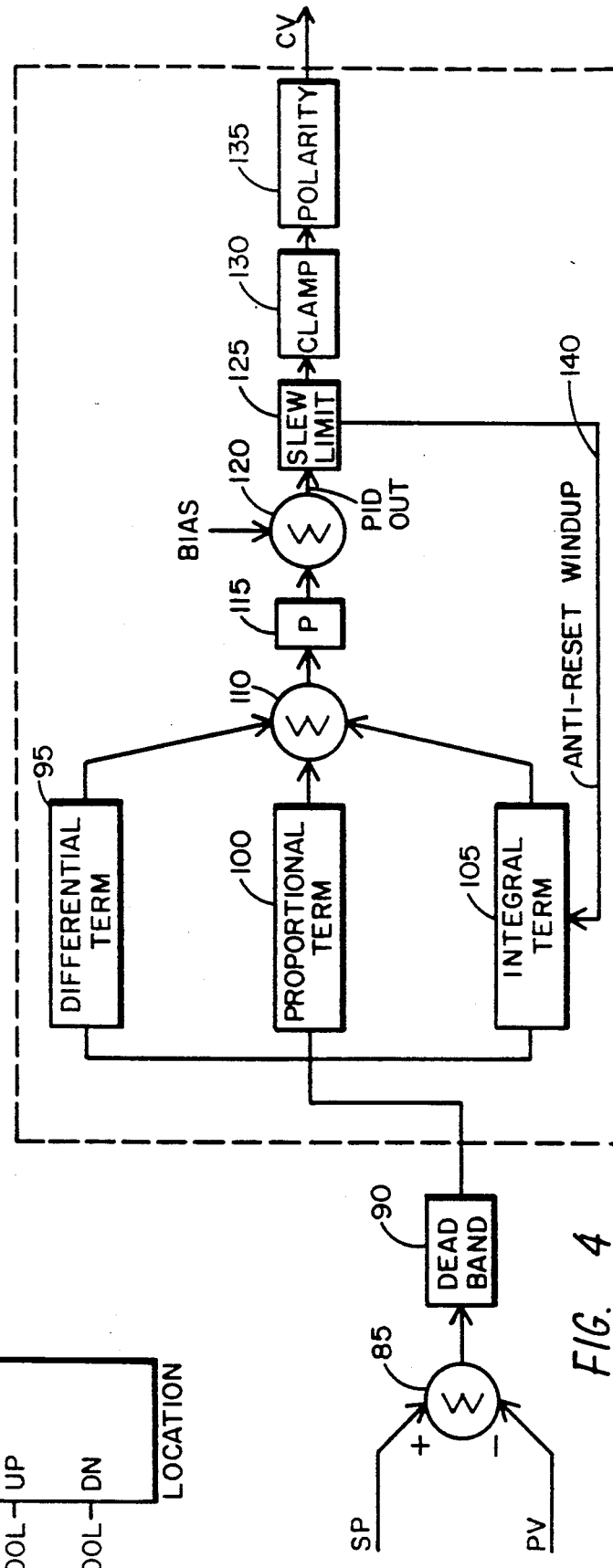
FIG. 3 is a function block diagram of the proportional integral differential controller of the present invention.

The present invention will be described with respect to a controller including a proportional section, a differential section, and an integral section, although it will be recognized that most such controllers utilize only a proportional section and an integral section since differential sections may cause instability. The illustrated system employs a programmable integral differential (PID) controller 80 which is conveniently implemented within the control program provided to PLC 35. That is, in the present invention, a PID controller is implemented with a RAM loaded function block which is loaded in RAM 45. A graphic representation of how this PID function block (PID controller) appears to the user is shown in FIG. 3. The PID function block representation of FIG. 3 includes the parameters EN, SP, PV, MAN, UP, DN, LOCATION, OK and CV which are defined below in Table 1.

TABLE 1

| PARAMETER | TYPE | DESCRIPTION |
|---|---|---|
| EN | Boolean | Enables the function block for execution |
| SP | Integer | Set Point or goal for Process Variable |
| PV | Integer | Process Variable, actual process value |
| MAN | Boolean | Auto or Manual Mode Select |
| UP | Boolean | Raise the CV Output when in manual mode |
| DN | Boolean | Lowers the CV Output when in manual mode |
| LOCATION | Register | Actual location of PID data structure in PLC memory |
| OK | Boolean | Successful Execution of function block passes power |
| CV | Integer | Control Variable used to command changes in the process |

The OK output of the function block depicted in FIG. 3 will pass power flow whenever the function block is enabled. The Auto or Manual Mode Select input (MAN) is a boolean input into the function block of FIG. 3 which forces the command variable CV to track the value in a Manual Register within RAM 45. This Manual Register is a register which exists in the data structure of the function block, such register being incremented or decremented by the "UP" or "DN" inputs to the function block if the function block is in manual mode. Input UP is a manual mode up adjustment whereas Input DN is a manual mode down adjustment. Otherwise, when the function block is an auto mode, the Manual Register will track the CV output.

Whenever there is power flow (i.e., an active input), at EN and no power flow at MAN, the aforementioned PID inputs are applied to SP and PV, with the result being placed in CV. OK is set to true if the PID function executes successfully and is set to false if the PID function fails to execute successfully. When there is power flow at EN and at MAN, the CV output is controlled by the UP and DN inputs. The known PID algorithm represented by terms 95, 100 and 105 is executed so that the calculated result tracks with the manually controlled CV value. The PID function is prevented from building up an integral component when the process is being controlled manually as will be explained in greater detail subsequently.

Figure 4:
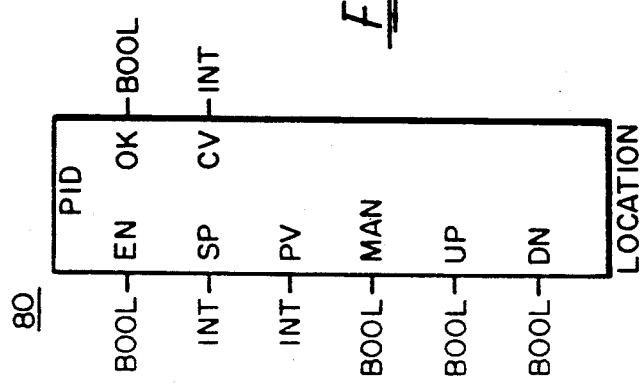
FIG. 4 is a block diagram of a proportional integral differential controller in one form of the present invention.

FIG. 4 is a block diagram which depicts the operation of PID controller 80 of FIG. 3. The process variable (PV, a feedback term from the controlled process) is subtracted from the set point (SP) at summing junction 85. The resultant error output (SP−PV) is subjected to a deadband or deadzone as indicated at 90. More specifically, two deadband registers (not shown) are provided within RAM 45, one register being designated a high range register and the other register being designated a low range register. The high range and low range registers contain respective limits which will affect the error output (SP−PV) value. If deadband is selected, the error signal must be outside the range between the selected deadband limits for the error to affect the control variable CV output. If the error is inside the deadband limits stored in the high range and low range registers, then the actual error applied to the PID controller will be 0.

The resultant error signal is then processed by PID controller 80 in accordance with the present invention. But for the differences later discussed, the resultant error signal is processed to derive a proportional term 100, an integral term 105 and a differential term 95 in the same manner as typically employed by those skilled in the art who implement PID controllers either in hardware or software. The proportional, integral and differential terms thus produced are summed at summing junction 110 as shown in FIG. 4. The resultant sum is amplified by a gain factor P at 115 and appropriately biased at 120.

The resultant biased signal is designated the PID controller output signal $PID_{OUT}$ which becomes the control variable signal (CV) after processing by an intermediate slew limit term 125, a clamp 130 and polarity adjustment 135 as shown in FIG. 4 and now discussed in more detail. Clamp 130 provides an absolute assurance that the control variable CV is never permitted to exceed a predetermined value. This is useful for preventing an undesired condition, such as overspeed, excessive temperature or other condition which is not acceptable in the controlled process. The polarity term 135 adjusts or inverts the polarity of the control variable signal CV as necessitated by the controlled process.

The slew limit term 125 detects when the PID controller output signal $PID_{OUT}$ provided thereto reaches a preselected slew rate limit. Information as to this occurrence is fed back to the integral term on the Anti-Reset Windup line 140 as shown in FIG. 4. If the PID output signal $PID_{OUT}$ exceeds the maximum value allowed by the selected slew rate limit of the slew rate limit term 125, then the integral term 105 is forced to a value such that the proportional term 100 plus the derivative term 95 plus the bias term 120 will be equal to the slew rate limited output at 125. In this manner, the integral term is not permitted to continue integrating and accumulating error. The slew rate limit associated with the slew limit term 125 is selected to be equal to or less than the value of the clamp associated with clamp 130. In other words, when the present invention is employed to limit the integral term, the integral term cannot run away while the controlled process is in slew rate limit. This permits control to return to closed loop linear operation much faster than if there was no anti-reset windup action such as that provided by the invention.

In accordance with the invention, if the PID controller were to try to slew the CV output signal to a value greater than the slew rate limit selected by the user, the PID output signal $PID_{OUT}$ is limited to the maximum slew rate limited value. When an actual slew rate limit is imposed, the PID controller adjusts the integral term 105 used in calculating and producing the control variable signal CV such that the CV signal is forced to the slew rate limited value. This technique is referred to as anti-reset windup and is applicable mainly to PID functions in the aforementioned manual control mode (not close loop control) or when an absolute level clamp is reached.

In other words, anti-reset windup will be applied to the integral term 105 whenever a $PID_{OUT}$ output limit has been reached or whenever the function block is in the manual mode. This action prevents integral term 105 from saturating. Integral term 105 is adjusted to a value which holds the output $PID_{OUT}$ and hence the CV signal at its clamped value.

While an apparatus for preventing the runaway of the integral term of a PID controller has been described above, it will be appreciated that a method for preventing runaway of such integral term has also been disclosed. More specifically, a method is disclosed for preventing the runaway of an integral term of a proportional integral differential controller which is usable in a feedback system. The feedback system is operative on a controlled process and includes a summing junction for subtracting a process variable sensed in the controlled process from a set point to produce an error signal which is supplied to the controller. The controller produces a control variable signal from the error signal. The method includes the steps of imposing a slew rate limit on the control variable output signal and detecting when the controller attempts to drive the control variable output signal to exceed the slew rate limit. The method further includes the step of adjusting the integral term associated with the controller to a value which forces the control variable output signal to the slew rate limit.

The foregoing describes apparatus and method for preventing the undesired runaway of the integral term of a proportional integral differential controller in a feedback system within a controlled process. While described with regard to a generalized PID control, the invention may be used with a proportional plus integral controller (PI control) and may be applied to any system in which the controlled device is subject to a limited value, either mechanical or electrical. For example, the motor 15 may have a maximum mechanically limited speed rather than a rate limit.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A proportional plus integral controller for use in a feedback system associated with a controlled process, said feedback system including a summing junction for subtracting a process variable sensed in said controlled process from a set point to produce an error signal which is supplied to said controller, said controller comprising:

means for producing a proportional term 1 and an integral term 2 from said error signal; XW summing 4 means for summing said proportional term and said integral term to produce a control Y variable output signal;

limiting means for imposing a maximum slew rate limit value on said control variable output signal;

detecting means for detecting when said controller attempts to drive said control variable output signal to exceed said maximum slew rate limit value; and adjusting means for adjusting the rate of change of said integral term to a value which tracks said control variable output signal to prevent runaway of said integral term.

2. A proportional plus integral controller for use in a feedback system associated with a controlled process, said feedback system including a summing junction for subtracting a process variable sensed in said controlled process from a set point to produce an error signal which is supplied to said controller, said controller comprising:

- means for producing a proportional term and an integral term from said error signal;
- summing means for summing said proportional term and said integral term to produce a control variable output signal;
- biasing means for biasing said control variable output signal;
- limiting means for imposing a maximum limit value on said control variable output signal;
- detecting means for detecting when said controller attempts to drive said control variable output signal to exceed said maximum limit value; and
- adjusting means for adjusting said integral term to a value such that said proportional term plus said integral term plus said bias term equals said control variable output signal so as to prevent runaway of said integral term.

3. A method for preventing the runaway of an integral term of a proportional integral differential controller which is usable in a feedback system, said feedback system being operative on a controlled process and including a summing junction for subtracting a process variable sensed in said controlled process from a set point to produce an error signal which is supplied to said controller, said controller including a proportional term, a integral term and a bias term, said controller producing a control variable output signal from said error signal, said method comprising the steps of:

- imposing a slew rate limit on said control variable output signal;
- detecting when said controller attempts to drive said control variable output signal to exceed said slew rate limit; and
- adjusting said integral term associated with said controller to a value such that said proportional term plus said integral term plus said bias term equals the slew rate limit.

* * * * *